Jan. 13, 1959
J. E. GANTON
2,867,806
FASTENER STRIP
Filed July 26, 1954
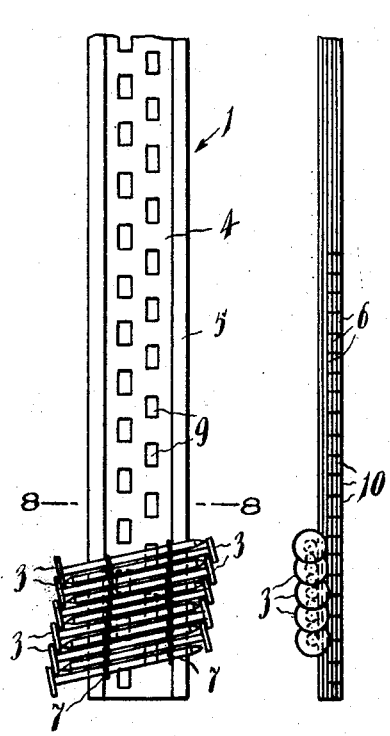
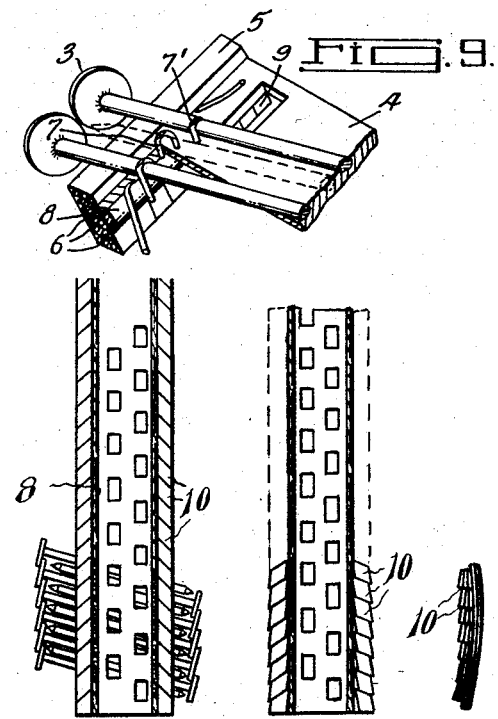
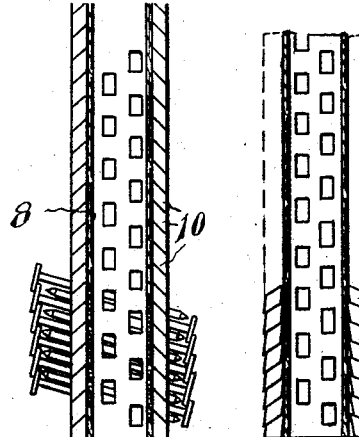
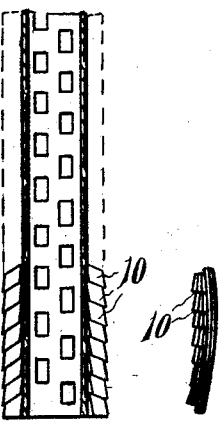
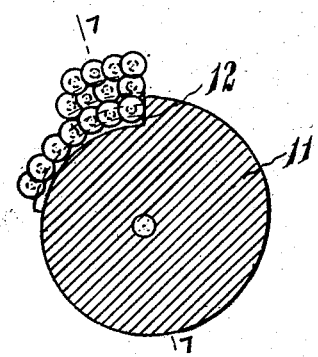
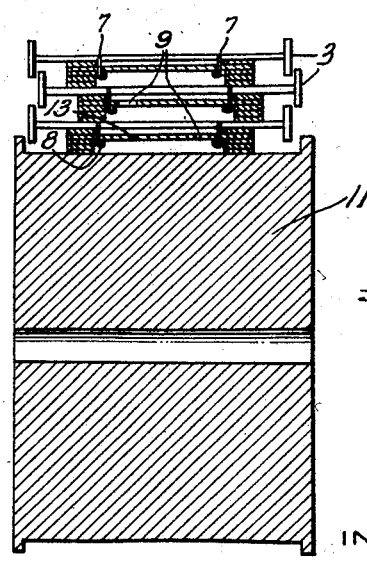
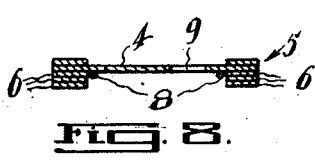
INVENTOR
JOSEPH E. GANTON

United States Patent Office 2,867,806
Patented Jan. 13, 1959

2,867,806

FASTENER STRIP

Joseph E. Ganton, Toronto, Ontario, Canada

Application July 26, 1954, Serial No. 445,803

6 Claims. (Cl. 1—56)

This invention relates to a means of handling nails and like fasteners and more particularly relates to strip for holding nails or the like by means of which the nails or fasteners may be fed serially in proper oriented and registered position to the driving member of a suitable driving mechanism.

The principal object of the invention is to devise nail or fastener mounting strip means which will support a maximum number of fasteners per unit strip length.

Another important object is to derive a nail or fastener strip which can be compactly coiled or rolled to occupy a minimum space without interference between the heads of the fasteners in superimposed layers.

Still another important object is to provide a strip means as aforesaid which will support the nails or fasteners so that they can be individually removed from the strip without releasing the adjoining fasteners.

Again it is an object to devise a strip means as aforesaid which will embody sufficient strength to carry a substantial weight of fasteners enabling them to be stored and fed to a driving machine without strip rupture yet will be of light and inexpensive construction.

One of the important features of the invention resides in providing a flexible strip of suitable material and mounting nails or fasteners on the strip in side by side relation with alternate fasteners reversed and the heads of the fasteners disposed out of a common plane in interfitting relation whereby the bodies or shanks of the fasteners are disposed in abutting or contiguous relation, and providing retaining means to hold the fasteners in position on the strip.

Another important feature resides in forming the strip as a pair of spaced relatively thick or built up narrow edge portions connected by a relatively wider central strip, the edge portions of the strip imparting tensile strength to the strip for strip feeding and also imparting structural strength to the strip to allow the nails or fasteners to be detached without strip rupture.

Again it is a feature of the invention to provide a strip roll in which a strip as aforesaid is rolled to provide a staggered arrangement of the nail or fastener heads on alternate layers whereby the built up edge portions of the strip rest on the nail shanks of the previous layer and carry the weight of the nails and the nail retaining means is relieved of any stress which would occur if the strip layers were spaced or suspended due to the engagement of the nail heads.

Still another feature resides in providing a nail retaining means which is weakened at points immediately overlying the nails whereby the nails can be individually separated from the strip without release of adjoining nails.

Again it is a feature to employ the central connecting portion of the strip as a means of feeding and registering the strip with the nails in correct position for co-operation with the mechanism of a suitable driving machine, the central strip portion being provided with an arrangement of staggered notches for co-operation with a feeding sprocket to provide the feed and registration aforesaid.

These and other objects and features will become apparent from the following description taken in conjunction with the accompanying drawings in which, Figure 1 is a plan view illustrating one embodiment of the invention.

Figure 2 is a side elevational view of the strip Figure 1.

Figure 3 is an under side plan view of the strips of Figures 1 and 2.

Figure 4 is a view similar to Figure 3 with the fasteners omitted and showing the strip in a bent form.

Figure 5 is a side elevational view of the bent strip of Figure 4.

Figure 6 is a part sectional part end elevational view showing the strip in rolled form on a central core.

Figure 7 is a transverse section on the line 7—7 of Figure 6.

Figure 8 is an enlarged transverse sectional view of the strip of Figure 1 taken on the line 8—8 of Figure 1.

Figure 9 is a fragmentary perspective view of the strip of Figure 1 showing the fastener retaining means.

Referring first to Figures 1 to 5 and 8 the embodiment of the invention illustrated comprises of a strip generally designated at 1 on which are mounted fasteners 2 shown as nails having at one end of an elongated shank portion an enlarged head 3.

The strip 1 comprises a central relatively thin and relatively wide web portion 4 connecting two relatively narrow and relatively thick edge portions 5. As illustrated in Figure 8 these edge portions 5 are formed by laminations 6 and both the laminations 6 and web portion 4 are formed of a suitable material which can be deformed or rolled without rupture. For instance a relatively tough and flexible cardboard may be used but it will be understood that various other types of material may be employed by those skilled in the art.

According to the invention the fasteners 2 are disposed on the strip so that their shanks or bodies lie immediately contiguous to provide a maximum number of fasteners per unit length of strip. To this end the fasteners or nails are disposed so that alternate nails extend generally transversely of the length of the strip across the strip in opposite directions. The lengths of the shanks or bodies of the fasteners are greater than the width of the strip 1 so that the heads 3 of alternate nails lie at opposite sides of the strip beyond the strip edge portions 5.

By disposing the fasteners 2 at a bias angle to the strip the heads 3 may be arranged so that their planes are inclined at an angle to the strip edge, and with the head of the successive fasteners disposed in the same direction on the strip interfitting, the one to underlie the other.

Maintaining the fasteners 2 in position on the strip 1 are threads or wires 7 looped over the fastener shanks and passing through the central web portion 4 to engage reinforcing cords 8, as shown in Figure 9.

The central web 4 of the strip is provided with two longitudinal rows of slots 9 with the slots of one row being staggered with respect to the slots on the other row. Preferably also the edge portions 5 of the strip from the under side thereof are cut on the bias as at 10 to assist in the curling or rolling of the strip as illustrated in Figure 5, for placing it in rolled form about a suitable core 11.

In use of the strip device the slots 9 form a means of feeding the strip to the operating mechanism of a suitable nail driving or fastener driving machine of instance by the use of a sprocket device.

The nail or fastener handling mechanism of the machine may readily be adapted to pick off the successive oppositely disposed fasteners and orient them into desired position for driving, but as the mechanism forms no part of the present invention, no details are shown.

According to the invention the fastener retaining means in the form for instance of the threads 7 of Figure 1 are preferably formed so that they will rupture immediately above the fastener or nail releasing the single fastener without releasing adjoining fasteners. For instance after forming of the strip 1 with the fasteners 2 mounted thereon the threads or wires 7 may be treated by abrading to provide a weakened portion 7' as shown in Figure 9 or by a chemical, to weaken them immediately above each fastener. Alternatively, the wires 7 could be of a fusible material whereby the application of heat thereto at each fastener as it is to be released would effect severance at this point.

As shown in Figure 6 the core 11 is in the form of a somewhat spiral like member providing a step 12 to constitute the starting point of the strip row when wound on the form so that there will be no bulge at one side as will be clear from Figure 6.

By providing the built up or relatively thick edge portions 5 the successive layers 13 of the strip are spaced from each other as illustrated in Figure 7 so that the heads 3 of the fasteners of each row are suspended clear of the shanks of the fasteners of the layers above and below to prevent any strain being placed on the retaining means 7. That is each layer is supported by the strip edge portions 5 from the shanks of the fasteners of the layer immediately there below.

Also as illustrated in Figure 7 the layers are wound on the core 11 whereby there is an alternative lateral staggering of the layers 13 accomplished by slightly distorting the strip so that the heads 2 of the fasteners in one layer are in a plane laterally displaced from the plane of the heads of the fasteners in the layers immediately above and below, to provide for greater compactness.

It will be understood that other various modifications and alterations in detail and material may be made by those skilled in the art without departing from the scope of the appended claims.

What I claim as my invention is:

1. A fastener carrying strip comprising a longitudinally extending flexible sheet of material having both faces thereof formed with relatively thicker edge portions, the edges of one face supporting a plurality of fasteners disposed in spaced relation transversely of said sheet and extending beyond said edges on opposite sides of said sheet, means for securing said fasteners to said strip and the edges upon the opposite face of said sheet having bias cuts throughout the length of said strip to enable rolling of the strip and being adapted to space succeeding layers of said fastener supporting sheet as said sheet is wound in the form of a coil.

2. A fastener strip comprising a flexible central web portion having edge portions of a thickness extending above said central web portion on opposite faces of said web, a plurality of fasteners disposed above one face of said web and supported by said edge portions, the shanks of said fasteners extending transversely of said web and supported by said edge portions at spaced points, the heads of said fasteners being disposed with each adjacent head lying in a different plane, means to retain said fasteners on said strip, the edges on the opposite face of said web having bias cuts throughout the length of said strip to enable rolling of the strip and being adapted to space succeeding layers of said fastener supporting web as said web is wound in the form of a coil, said web being formed centrally thereof with at least two longitudinal rows of notches with the notches of one row being staggered relative to the notches of the other row.

3. A fastener strip comprising a longitudinal central flexible relatively thin web having edge portions of a thickness extending above both faces of said web and a series of fasteners having heads and shanks disposed above one face of said web transversely thereof and supported by said edge portions, the shanks of said fasteners being longer than the width of said strip and said fasteners being disposed with alternate fasteners lying in opposite directions across said strip and with the heads of adjoining similarly disposed fasteners lying in different planes outwardly of said edge portions whereby the shanks of said fasteners are disposed in spaced relation, means to retain said fasteners on said strip adjacent to the said edge portion and the edges on the opposite face of said web having bias cuts at intervals throughout the length of said strip and being adapted to space succeeding layers of said fastener supporting web as said web is wound in the form of a coil.

4. A fastener carrying strip comprising a longitudinally extending flexible sheet of material having edge portions of a thickness extending above both faces thereof, the edge portions on one face supporting a plurality of fasteners in which said fasteners are disposed with their shanks extending on a bias angle across said strip, and with their heads lying in planes inclined to the length of said strip, the head of each fastener lying at one side immediately beneath the head of the immediately preceding fastener disposed in the same direction, and means for securing said fasteners to said strip.

5. A fastener carrying strip according to claim 4 in which said strip edge portions of the side of said sheet opposite to said fasteners are formed with bias cuts at intervals throughout the length of the strip to enable rolling of the strip.

6. A fastener carrying strip according to claim 5 in which said sheet is formed centrally thereof with at least two longitudinally extending rows of notches, with the notches of one row being staggered relative to the notches of the other row.

References Cited in the file of this patent

UNITED STATES PATENTS

| | | |
|---|---|---|
| 226,817 | Woodward | Apr. 20, 1880 |
| 354,462 | Copeland | Dec. 14, 1886 |
| 383,907 | Prouty | June 5, 1888 |
| 415,175 | Prouty | Nov. 12, 1889 |
| 569,886 | Raymond | Oct. 20, 1896 |
| 1,046,665 | Smith | Dec. 10, 1912 |
| 1,637,128 | Palmer | July 26, 1927 |